Patented Apr. 26, 1927.

1,626,321

UNITED STATES PATENT OFFICE.

IRVING SYDNOR BARKSDALE, OF GREENVILLE, SOUTH CAROLINA.

PROCESS FOR THE PREPARATION OF CUCURBOCITRIN.

No Drawing.   Application filed July 8, 1926. Serial No. 121,277.

This invention relates to a process for the preparation of cucurbocitrin a drug efficacious in the lowering of high blood pressure.

An object of the invention is the provision of a process for isolating a drug which I term "cucurbocitrin" from the seed of the cucurbita citrellus or water melon, this product being particularly efficacious for the reduction of high blood pressure in man.

This invention will be best understood from a consideration of the following detailed description; nevertheless it is to be understood that the invention is not confined to the disclosure, being susceptible of such changes and modifications which shall define no material departure from the salient features of the invention as expressed in the appended claims.

In carrying out my process I take 500 grams of water-melon seeds and reduce them to a powder of sufficient texture so that it will pass through a 30 mesh screen. This powdered material is then macerated for twelve hours with 1500 cubic centimeters of distilled water which has been rendered slightly alkaline with ammonium hydroxide and which is heated to a temperature of 60° C. A brownish-yellow infusion is thus formed which is strained through cheesecloth or gauze and filtered several times until the liquid obtained is very clear. This liquid is then concentrated over a water bath until it obtains the viscosity of a thin sirup, the water in the outer vessel being allowed to boil during the whole process of evaporation.

Powdered lead subacetate is then added to the concentrated infusion or liquid and the same is vigorously and constantly stirred until a copious, curdy, yellowish precipitate is formed. The precipitate forms very readily. The object of the employment of the subacetate of lead is for the purpose of eliminating such organic matter which contains glucoside or saponin. The liquid is then filtered and the precipitate which remains on the filter is washed several times with distilled water.

Hydrogen sulphid is permitted to vigorously bubble through the liquid until the same has been decomposed as much as possible. The hydrogen sulphid frees any of the substance that may have been held in the precipitated organic matter and the sulphid also aids in removing the lead from the preparation. This hydrogen sulphid treated solution is strained through gauze and filtered and the liquid is then concentrated in any approved manner until it has obtained substantially one-half its volume when it is again filtered. The number of evaporations at this time should be such that the liquid has become very clear. The liquid may be heated and maintained hot while filtering in order to free the solution of any lead that remains in the same.

At this time hydrogen sulphid is again permitted to vigorously pass through the solution in order to remove any lead that still remains in the solution. After the second treatment with the hydrogen sulphid the the solution is again filtered to remove any deposits.

To the liquid thus obtained is added equal parts of ethyl ether and dehydrated ethyl alcohol in excess when a finely divided creamy white precipitate results. The solution is poured off the precipitated element and dried on a water bath over a low flame. This dried substance is a drug which I have termed "cucurbocitrin" and which is effective for lowering high blood pressure in man.

The drug is administered in an aqueous solution either by mouth or intravenously or subcutaneously or intramuscularly or rectum.

What I claim is:

1. A process for producing a drug from water melon seeds which comprises reducing the seeds to a powder, mixing the powdered seeds with distilled water at a temperature of 60 degrees centigrade, the water being slightly alkaline to form an infusion, concentrating said infusion, adding lead subacetate, passing hydrogen sulphid through the liquid, filtering the solution and then adding ethyl ether and dehydrated ethyl alcohol in excess to form a precipitate, removing the liquid from the precipitate, and drying the same.

2. A process for producing a drug with water melon seeds which comprises reducing the seeds to a powder, mixing the powdered seeds with warm water to form an infusion, concentrating said infusion by evaporation of the moisture, adding lead subacetate, passing hydrogen sulphid through the liquid, removing the precipitate formed in the liquid and then adding ethyl ether and dehydrated ethyl alcohol in excess to form a precipitate, filtering the liquid to recover the precipitate and drying said precipitate.

3. A process for producing a drug from water melon seeds, which comprises reducing 500 grams of water melon seeds to a powder, macerating this powder for twelve hours with 1500 cubic centimeters of distilled water which has been rendered slightly alkaline with ammonium hydroxide, said water being at a temperature of 60 degrees centigrade to form a brownish yellow infusion, straining said infusion through gauze and filtering the same, concentrating the liquid until said liquid has the viscosity of a thin sirup, adding sufficient powdered lead subacetate to the concentrated liquid while stirring the liquid until a precipitate is formed, and filtering the liquid to remove the precipitate, passing hydrogen sulphid through the filtered liquid to cause removal of organic matter and lead, filtering the liquid thus treated and concentrating the same, then adding equal parts of ethyl ether and dehydrated ethyl alcohol for causing a precipitate.

4. A process for producing a drug which comprises mixing ground water melon seeds with a warm, weak alkali solution, straining said solution, concentrating the strained solution until the same has the viscosity of a thin sirup, adding a lead salt to the concentrated solution which causes a precipitate of organic matter, filtering the precipitated solution while washing the filtrate, passing hydrogen sulphid through the filtered solution to remove organic matter and the lead compound, filtering the solution thus treated, concentrating said solution, and then adding equal parts of ethyl ether and dehydrated ethyl alcohol in excess to cause a finely divided creamy precipitate, filtering the solution to obtain the filtrate and drying the filtrate over a low flame.

5. A process for producing a drug which comprises mixing ground water melon seeds with a warm weak alkali solution, straining said solution, concentrating the strained solution until the same has the viscosity of a thin sirup, adding a lead salt to the concentrated solution which causes a precipitate of organic matter, filtering the precipitated solution while washing the filtrate, passing hydrogen sulphid through the filtered solution to remove organic matter and the lead compound, filtering the solution thus treated, concentrating said solution, filtering the concentrated solution, again passing hydrogen sulphid through the filtered solution, and then adding equal parts of ethyl ether and dehydrated ethyl alcohol in excess to cause a finely divided creamy precipitate, filtering the solution to obtain the filtrate, and drying the filtrate over a low flame.

IRVING S. BARKSDALE, M. D.